(12) United States Patent
Webb et al.

(10) Patent No.: US 7,490,866 B2
(45) Date of Patent: Feb. 17, 2009

(54) ANCHORING DEVICE FOR PIPE COUPLING

(75) Inventors: Ian Richard Webb, Buckinghamshire (GB); Neil John Taylor, Herfordshire (GB)

(73) Assignee: Taylor Kerr (Couplings) Limited, Buckinghamshire (GB)

( * ) Notice: Subject to any disclaimer, the term of this patent is extended or adjusted under 35 U.S.C. 154(b) by 5 days.

(21) Appl. No.: 10/504,778

(22) PCT Filed: Feb. 20, 2003

(86) PCT No.: PCT/GB03/00754

§ 371 (c)(1),
(2), (4) Date: Aug. 16, 2004

(87) PCT Pub. No.: WO03/071178

PCT Pub. Date: Aug. 28, 2003

(65) Prior Publication Data

US 2005/0104369 A1    May 19, 2005

(30) Foreign Application Priority Data

Feb. 20, 2002 (GB) ................................ 0204003.8

(51) Int. Cl.
*F16L 17/00* (2006.01)
*F16L 21/02* (2006.01)
(52) U.S. Cl. ..................... 285/340; 285/382.7; 285/417; 285/419; 285/367
(58) Field of Classification Search ................. 285/419, 285/417, 80, 81, 339, 345, 374, 382.7, 340, 285/367, 373
See application file for complete search history.

(56) References Cited

U.S. PATENT DOCUMENTS

| 2,230,725 | A |   | 2/1941  | Nathan     |         |
|-----------|---|---|---------|------------|---------|
| 2,341,164 | A |   | 2/1944  | Shimek     |         |
| 2,457,077 | A | * | 12/1948 | Woolsey    | 285/105 |
| 2,459,251 | A | * | 1/1949  | Stillwagon | 285/104 |
| 2,491,004 | A |   | 12/1949 | Graham     |         |
| 3,432,189 | A | * | 3/1969  | Buller     | 285/232 |
| 3,851,901 | A | * | 12/1974 | Sills      | 285/112 |
| 3,888,520 | A | * | 6/1975  | Brennan    | 285/310 |

(Continued)

FOREIGN PATENT DOCUMENTS

DE             39 26 626       10/1990

(Continued)

*Primary Examiner*—Daniel P. Stodola
*Assistant Examiner*—Jay R Ripley
(74) *Attorney, Agent, or Firm*—Flynn, Thiel, Boutell & Tanis, P.C.

(57) ABSTRACT

An anchoring device for a pipe coupling including an annular channel of generally U-shaped cross-section. The channel has a web portion with flanges and projecting radially inwardly. A frusto-conical gripping ring is located in the channel with its outer edge inside the web portion adjacent one of the flanges and its inner edge adjacent the other flange and projecting inwardly beyond this latter flange. The annular channel forms an incomplete ring and is compressible circumferentially. The anchoring device is fitted inside a clamping device, which fits around a pipe coupling. The clamping device has a tensioning for tightening the clamping device around the pipe, compressing the annular channel and causing the inner edge of the frusto-conical gripping ring to engage the outer surface of the pipe and thus grip the pipe.

16 Claims, 2 Drawing Sheets

U.S. PATENT DOCUMENTS

| | | | | |
|---|---|---|---|---|
| 3,995,897 A | * | 12/1976 | Paskert | 285/340 |
| 4,108,479 A | | 8/1978 | Straub | |
| 4,664,422 A | * | 5/1987 | Straub | 285/112 |
| 4,842,306 A | * | 6/1989 | Zeidler et al. | 285/104 |
| 5,772,257 A | * | 6/1998 | Webb et al. | 285/112 |
| 6,269,524 B1 | * | 8/2001 | Cassel | 24/279 |
| 6,328,352 B1 | * | 12/2001 | Geppert et al. | 285/373 |
| 6,378,915 B1 | * | 4/2002 | Katz | 285/342 |
| 2003/0042739 A1 | * | 3/2003 | Barbett et al. | 285/367 |

FOREIGN PATENT DOCUMENTS

GB     1 214 847     12/1970

* cited by examiner

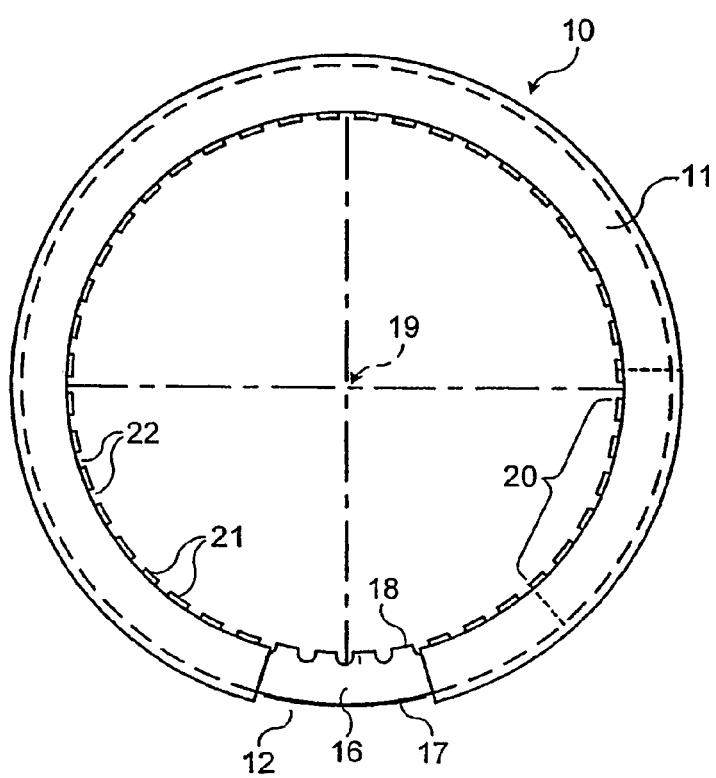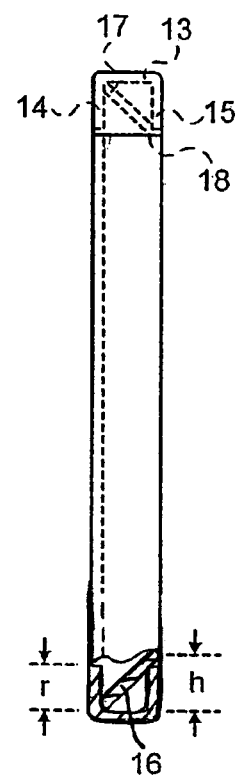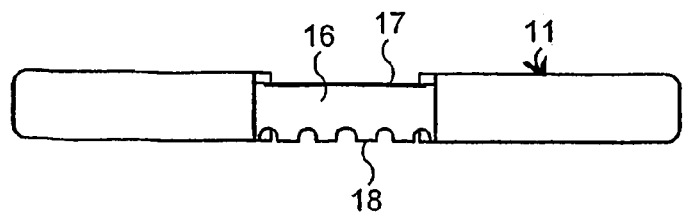
FIG. 1
FIG. 3
FIG. 2

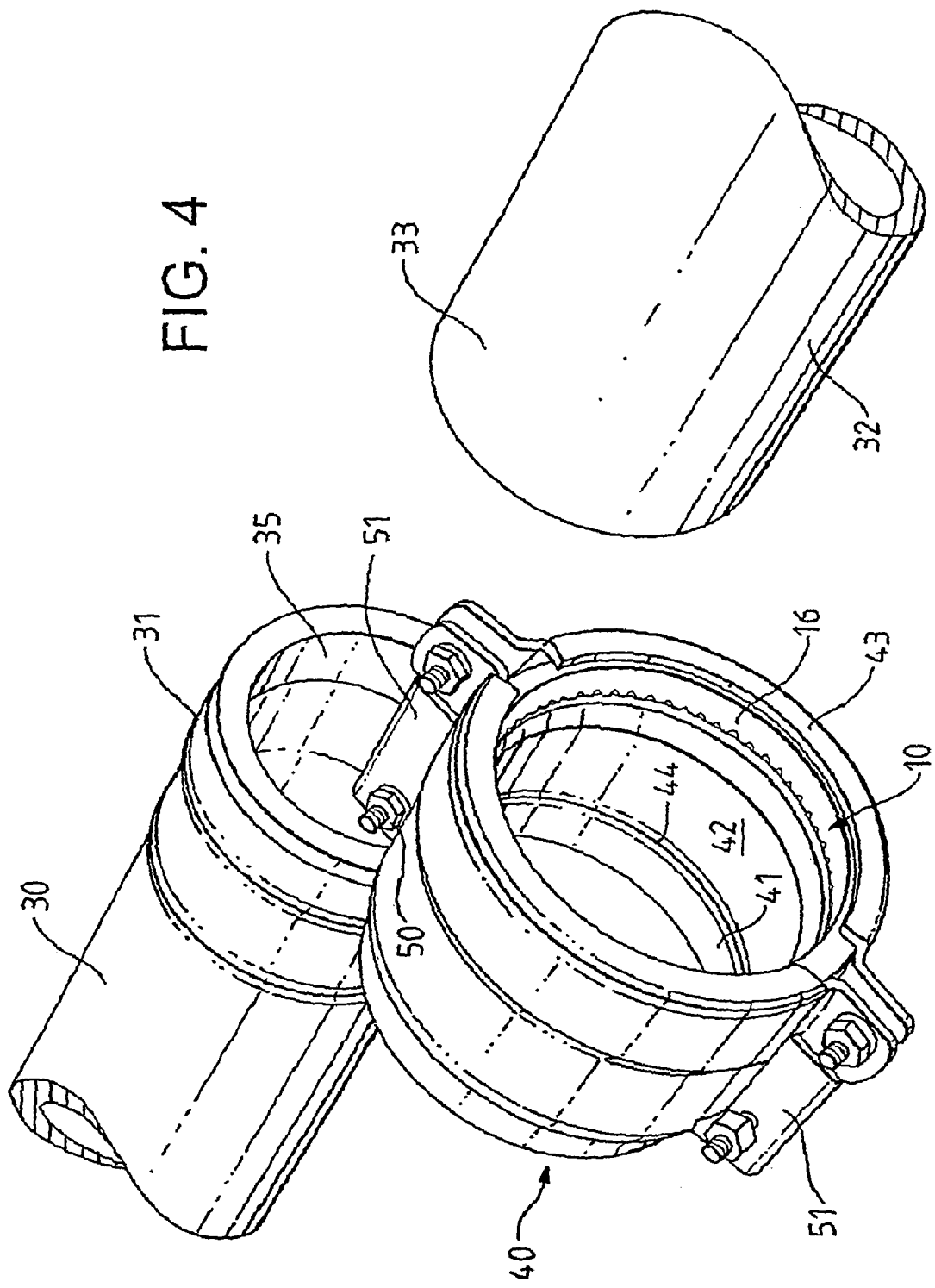

ANCHORING DEVICE FOR PIPE COUPLING

FIELD OF THE INVENTION

The present invention relates to pipe couplings and is concerned with a system for anchoring pipes to lock them axially together. It has particular application where it is necessary to adapt existing pipe joining methods, such as clamps, collars or bell ends, to accommodate means for axially restraining them.

BACKGROUND OF THE INVENTION

Some known pipe couplings have been designed which have no provision for axial restraint. Changes in circumstances may require such couplings to perform to a higher specification than that of the original design. This leads to a requirement for axial locking of the pipes to be added to the coupling. Attempts to envelope the existing coupling by an external gripping means have been expensive, clumsy, bulky and heavy and aesthetically unpleasing which is unacceptable in applications such as drainage pipes for buildings where the pipework is often visible.

There is a need for a self-contained anchoring device which can be employed with various different existing designs of pipe joining systems to enable the pipes to be axially restrained.

According to the present invention there is provided an anchoring device for a pipe coupling comprising an annular channel of generally U-shaped cross-section having a web portion with flanges projecting radially inwardly from the longitudinal ends of the web portion, and a frusto-conical gripping ring located in the channel, the outer edge of the gripping ring being located inside the web portion of the annular channel adjacent one of the radially inwardly projecting flanges, the inner edge of the gripping ring being adjacent the other radially inwardly projecting flange and projecting radially inwardly beyond the said other flange, the annular channel being compressible circumferentially so that when the anchoring device is placed around a pipe of appropriate size and the annular channel is compressed, the inner edge of the frusto-conical gripping ring engages the outer surface of the pipe.

The annular gripping ring of the present invention provides a self-contained means for gripping a pipe. It is independent of the other prime function of a pipe joint, namely sealing. It will resist end load and will resist internal pressure.

Most known pipe couplings which have axial restraint are in the form of a cast iron or sheet metal housing with a flange at 90° to the pipe surface which either itself engages a corresponding groove or shoulder on the pipe surface or provides a surface against which an anchoring device is placed that will grip the pipe end surface. In either case, the strength of the material of the housing is critical in determining the strength of the actual restraint. Thus, in many cases, the known clamping device can be disproportionately bulky in relation to the pipework it connects.

In the present invention, the forces generated by the axial restraint system where the gripping ring engages the pipe on its inner periphery and is supported by the flange and web portion on its outer periphery are entirely contained by the channelled ring which encapsulates the gripping ring except on the inside of the channel where the channel is open to allow the inner edge of the gripping ring to project out of the channel to grip the pipe surface.

An anchoring device according to the invention may be used, for example, in conjunction with lightweight pipe joining clamps previously designed purely for gravity applications such as drainage pipes to convert them into a system capable of withstanding working pressures such as 16 bar and test pressures up to 64 bar. Jointing systems such as push-fit spigot and socket systems can now be converted to axial restraint systems by means of a simple sheet metal clamp that contains an anchoring device in accordance with the invention. Previously, it would have been necessary to cut off the ends of the pipe to enable a straight plain ended connector to be used, or to have a special clamp substantially larger than the profile of the push-fit joint that would clamp over the top and hold the pipes in place. Due to the bulk and varying length of such systems, a simple conversion of such pipe joints from non-restrained to restrained across a range of pipe diameters required by the piping industry has proved impossible in an economically viable way.

Preferably, the annular channel is an incomplete ring. The interior diameter of the web portion of the annular channel is smaller than the external diameter of the gripping ring in the unstressed condition so that the gripping ring is a tight fit in the channel. The annular channel has a circumferential gap so as to allow it to be compressed in use in order to allow the inner edge of the gripping ring to engage the pipe. The internal radial height of the flanges from the web portion is less than the overall width of the gripping ring measured in the radial direction so that the gripping ring projects inwardly beyond the flanges.

The inner edge of the gripping ring may be formed with a series of teeth to bite into the outer surface of the pipe when the ring is compressed. The gripping ring may extend more than 360° around the axis of the anchoring device so that the ends of the gripping ring overlap. The teeth may be flat in the conical plane of the gripping ring so as not to interfere with one another where they overlap when the anchoring device is compressed.

The anchoring device may be fitted into any suitable clamping device which fits over the pipe coupling. When the clamping device is tightened, the gap in the annular channel is reduced tightening the gripping ring around the pipe and causing it to engage the pipe surface.

When pressure is applied to the pipes, either in the form of a dead weight or by hydrostatic pressure, the pipe attempts to pull from the fitting causing the gripping ring to attempt to rotate or flatten inside the annular channel. It has been found that such rotational or flattening forces may easily be resisted by conventional clamping means used for clamping pipes intended for use in gravity pipe systems.

BRIEF DESCRIPTION OF THE DRAWINGS

An embodiment of the invention will now be described by way of example with reference to the accompanying drawings of which:

FIG. 1 shows a side view of an anchoring device in accordance with the invention;

FIG. 2 shows an underneath plan view of the pipe anchoring device of FIG. 1;

FIG. 3 shows a front view, partly in section of the anchoring device of FIGS. 1 and 2; and FIG. 4 shows a perspective view of an anchoring device in accordance with FIGS. 1, 2 and 3 fitted in a clamping device with a spigot and socket push-fit pipe coupling.

DETAILED DESCRIPTION

Referring to FIG. 1, an anchoring device 10 comprises an annular channel 11 formed as an incomplete ring with a circumferential gap 12. The channel has a web portion 13 with flanges 14 and 15 projecting radially inwardly from the axial ends of the web portion. The channel 11 is formed from sheet steel.

An annular gripping ring 16 is of frusto-conical form with an outer edge 17 and an inner edge 18. The ring 16 subtends an angle of greater than 360° at the axis 19 of the device so as to overlap in the region 20. The inner edge of the gripping ring 16 is formed with teeth 21 which are separated from one another by gaps 22. The inner edges of the teeth are machined to provide sharp edges which can bite into the outer surface of a pipe. The teeth are not bent but flat so as to lie in the conical plane of the gripping ring so that they can pass smoothly over one another as the ring is compressed. The annular gripping ring is of steel.

As can be seen particularly in FIG. 3, the gripping ring 16 is snapped into the annular channel and fits with its outer edge 17 in the angle formed between the web portion 13 and the flange 14. The overall radial dimension h of the gripping ring 16 is greater than the radial dimension r of the flanges 14 and 15 so that the inner edge 18 of the annular ring with its gripping teeth 21 projects inwardly beyond the flanges 14 and 15. The inner edge 18 of the gripping ring is adjacent and supported by the flange 15.

FIG. 4 shows a spigot and socket push-fit pipe coupling comprising a pipe 30 with a socket end 31 and a pipe 32 with a plain spigot end 33. A rubber seal 35 is inserted in the socket end 31 and the spigot end 33 of the pipe 32 can be pushed inside the seal 35 of the pipe 32 to form a push-fit sealed pipe coupling.

An anchoring device 10 in accordance with FIGS. 1 to 3 is located in a clamping device 40 formed of pressed metal which fits around the spigot and socket coupling. The anchoring device is arranged so that the inner edge of the gripping ring faces towards the middle of the clamping ring. The clamping device is formed in two parts separated along a diametral plane and is generally cylindrical with a portion of reduced diameter 41 which fits around the pipe 30 and a portion of enlarged diameter 42 which fits around the enlarged diameter socket end 31 of the pipe 30 and a further enlarged portion 43 which receives the anchoring device 10. Tensioning means in the form of nuts and bolts 50 pass through flanges 51 along the edges of the two parts of the clamping device 40 and can be tightened to clamp the clamping device with the anchoring device around the pipe coupling. When the clamping device is tightened, the teeth 21 on the gripping ring bite into the surface of the pipe 32 so that the anchoring device grips the plain end of the pipe 32 to lock it against axial displacement. The shoulder 44 formed between the portion of enlarged diameter 42 and the portion of reduced diameter 41 engages the shoulder between the socket end 31 and the rest of the pipe 30 to hold the pipe 30 against axial displacement. Thus the clamping device locks the two pipes together against axial displacement.

The inner edge of the gripping ring faces towards the end of the pipe 32 so that when axial force is applied to the pipes tending to pull them apart, the gripping ring tends to flatten and the teeth bite further into the pipe surface gripping it more firmly.

The invention claimed is:

1. An anchoring device for use in a pipe coupling, said anchoring device comprising:

an annular channel of a generally U-shaped cross-section defined by a web portion and a pair of generally parallel flanges joined to and projecting radially inwardly from respective opposite circumferential edges of said web portion, each said flange having a terminal inner annular edge spaced radially inwardly from said web portion; and a frusto-conical gripping ring disposed in said channel between said flanges, said gripping ring having an outer circumferentially-extending edge supported within said channel at an intersection defined between one of said flanges and said web portion and an inner circumferentially-extending edge disposed in direct supportive engagement with said terminal inner annular edge of the other said flange and projecting radially inwardly beyond said other flange, said gripping ring being disposed in direct contacting engagement with both of said flanges, wherein said anchoring device does not house therein any sealing member for sealing the pipe coupling and said anchoring device is compressible circumferentially such that when said anchoring device is placed around a pipe and is compressed, said anchoring device does not act on any sealing member for sealing the pipe coupling and said inner edge of said gripping ring engages an outer surface of the pipe.

2. The anchoring device of claim 1, wherein said annular channel and said gripping ring are formed as respective incomplete rings to permit circumferential compression of said anchoring device, and said gripping ring extends more than 360 degrees about a central axis of said annular channel such that terminal ends of said gripping ring circumferentially overlap one another.

3. The anchoring device of claim 2, wherein an interior diameter of said web portion is less than an external diameter of said gripping ring in an unstressed condition such that said gripping ring conforms to said annular channel.

4. The anchoring device of claim 1, wherein a radial dimension of each said flange as measured between said web portion and the respective said inner annular edge is less than an overall radial dimension of said gripping ring to permit said gripping to project radially inwardly beyond said flanges.

5. The anchoring device of claim 1, wherein said inner edge of said gripping ring is formed with a series of teeth for biting into the outer surface of the pipe when said gripping ring is compressed.

6. The anchoring device of claim 5, wherein said gripping ring extends more than 360 degrees about a center axis of said anchoring device such that terminal ends of said gripping ring circumferentially overlap one another.

7. The anchoring device of claim 6, wherein said gripping ring lies in a conical plane and said teeth are flat and disposed in the conical plane so as not to interfere with one another where said teeth overlap when said anchoring device is compressed.

8. The anchoring device of claim 1, wherein said flanges are joined to the respective said circumferential edges of said web portion so as to define substantially right angles with said web portion.

9. A pipe coupling assembly comprising:

a circumferentially compressible anchoring device, said anchoring device including an annular channel of a generally U-shaped cross-section defined by a web portion and a pair of generally parallel flanges projecting radially inwardly from respective circumferential edges of said web portion, said flanges having respective terminal edges spaced radially inwardly from said web portion, and a frusto-conical gripping ring disposed in said channel, said gripping ring having an outer edge disposed inside said web portion at a junction defined between said web portion and one of said flanges, said gripping ring having an inner edge disposed in direct supportive engagement with said terminal edge of the other said flange and projecting radially inwardly beyond said other flange, said gripping ring being disposed in direct contacting engagement with both of said flanges;

a clamping device for fitting around a pair of aligned pipe ends, said clamping device having a portion for receiving said anchoring device, and said anchoring device being disposed in said portion and including no sealing member for sealing the aligned pipe ends; and a tensioning device disposed for tightening said clamping device and said anchoring device around the aligned pipe ends, wherein tightening said tensioning device circumferentially compresses said anchoring device so that when said pipe coupling assembly is placed around the aligned pipe ends and said anchoring device is compressed, said anchoring device does not act on any sealing member for sealing the pipe ends and said inner edge of said gripping ring engages an outer surface of one of the pipe ends to prevent axial displacement thereof.

10. The pipe coupling assembly of claim 9, wherein said clamping device is generally cylindrical and has a first portion disposed adjacent one axial end of said clamping device and a second portion disposed adjacent an opposite axial end of said clamping device, said second portion having an inner diameter which is larger than an inner diameter of said first portion, said anchoring device being disposed in said second portion.

11. The pipe coupling assembly of claim 9, wherein said annular channel and said gripping ring are formed as respective incomplete rings to permit circumferential compression of said anchoring device, and said gripping ring extends more than 360 degrees about a central axis of said annular channel such that terminal ends of said gripping ring circumferentially overlap one another.

12. The pipe coupling assembly of claim 11, wherein said inner edge of said gripping ring is formed with a series of teeth for biting into the outer surface of one of the pipe ends when said gripping ring is compressed.

13. The pipe coupling assembly of claim 9, wherein said anchoring device consists of said annular channel and said gripping ring.

14. A pipe coupling assembly comprising:

a pipe coupling comprising two axially-aligned pipes and a seal for preventing fluid from leaking from said pipe coupling;

an anchoring device sub-assembly comprising an annular channel of a generally U-shaped cross-section defined by a web portion and a pair of flanges projecting radially inwardly from respective circumferential edges of said web portion, said flanges having respective terminal ends spaced radially from said web portion, and a frusto-conical gripping ring disposed in said channel, said gripping ring having an outer edge portion disposed in said web portion adjacent one of said flanges, and an inner edge portion supported directly by contact with said terminal end of the other said flange and projecting radially inwardly beyond said other flange;

a clamping device fitting around said pipe coupling and having a portion configured for receiving said anchoring device sub-assembly, said anchoring device sub-assembly being disposed in said portion; and a tensioning device for tightening said clamping device, said anchoring device sub-assembly being circumferentially compressible such that when said clamping device is tightened by said tensioning device, said anchoring device sub-assembly is compressed about said pipe coupling and said inner edge portion of said gripping ring engages an outer surface of one of said pipes, said anchoring device sub-assembly being a separate component from said seal and not acting on said seal when said anchoring device sub-assembly is compressed.

15. The pipe coupling assembly of claim 14, wherein said clamping device is generally cylindrical and has a first portion disposed adjacent one axial end of said clamping device and a second portion disposed adjacent an opposite axial end of said clamping device, said second portion having an inner diameter which is larger than an inner diameter of said first portion, said anchoring device sub-assembly being disposed in said second portion.

16. The pipe coupling assembly of claim 14, wherein said annular channel and said gripping ring are formed as respective incomplete rings to permit circumferential compression of said anchoring device sub-assembly, and said gripping ring extends more than 360 degrees about a central axis of said annular channel such that terminal ends of said gripping ring circumferentially overlap one another.

* * * * *